(12) United States Patent
Bunsmann et al.

(10) Patent No.: US 7,591,500 B2
(45) Date of Patent: Sep. 22, 2009

(54) MOTOR VEHICLE COMPRISING A FULLY OPENING ROOF PART

(75) Inventors: Winfried Bunsmann, Bissendorf (DE); Olaf Weissmüller, Bramsche (DE); Udo Heselhaus, Ibbenbüren (DE)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/574,246

(22) PCT Filed: Sep. 17, 2004

(86) PCT No.: PCT/DE2004/002085

§ 371 (c)(1),
(2), (4) Date: Nov. 6, 2006

(87) PCT Pub. No.: WO2005/039912

PCT Pub. Date: May 6, 2008

(65) Prior Publication Data

US 2007/0210610 A1    Sep. 13, 2007

(30) Foreign Application Priority Data

Sep. 30, 2003    (DE) ................................ 103 45 275

(51) Int. Cl.
*B60J 7/02* (2006.01)
(52) U.S. Cl. ................................. 296/107.18
(58) Field of Classification Search ............ 296/107.18, 296/107.01, 107.07, 107.19, 107.2
See application file for complete search history.

(56) References Cited

U.S. PATENT DOCUMENTS

| | | | |
|---|---|---|---|
| 5,558,388 A | 9/1996 | Fürst et al. | |
| 6,767,044 B2* | 7/2004 | Tohda et al. | 296/107.01 |
| 6,786,528 B2* | 9/2004 | Guillez et al. | 296/108 |
| 2002/0135200 A1* | 9/2002 | De Gaillard | 296/107.01 |
| 2006/0249979 A1* | 11/2006 | Queveau et al. | 296/107.19 |
| 2006/0279103 A1* | 12/2006 | Bunsmann et al. | 296/107.18 |
| 2007/0152467 A1* | 7/2007 | Heselhaus et al. | 296/107.01 |
| 2007/0194593 A1* | 8/2007 | Heselhaus | 296/107.01 |
| 2007/0194594 A1* | 8/2007 | Heselhaus | 296/107.01 |

FOREIGN PATENT DOCUMENTS

| | | |
|---|---|---|
| EP | 0 992 384 | 4/2000 |
| EP | 1 151 884 | 11/2001 |
| WO | 01/19633 | 3/2001 |
| WO | 03/076220 | 9/2003 |

* cited by examiner

*Primary Examiner*—H Gutman
(74) *Attorney, Agent, or Firm*—Friedrich Kueffner

(57) ABSTRACT

A motor vehicle with an automobile body having two rigid body regions located on both sides above side window regions. At least two panel-shaped roof sections lay behind one another between the two body regions, which roof sections can move relative to the lateral body sections, and can move out of the closed position into an open position further below in the automobile body. From the closed position of the roof sections, a front roof section can be moved over a rear roof section by guiding it laterally like a sliding sunroof. The front end regions of the roof sections can be raised from this position so that the roof sections can be lowered into the automobile body. In the closed position of the roof sections, a rear window, which can be separately moved between an open position and a closed position, borders directly on the rear roof section.

9 Claims, 18 Drawing Sheets

MOTOR VEHICLE COMPRISING A FULLY OPENING ROOF PART

BACKGROUND OF THE INVENTION

1. Field of the Invention.

The invention concerns a motor vehicle with opening roof sections.

2. Description of the Related Art

DE 100 25 051 C1 discloses a motor vehicle with rigid lateral roof rails, between which, in one of the specific embodiments described there, in the closed roof position, four roof sections extend one after the other, which can be moved downward into the automobile body on guide rails that extend as far as the lowered position. The first two roof sections are connected to each other. Therefore, these two roof sections must be moved out of the closed position together. In this connection, guide rails for the two front roof sections lie beneath the rear roof sections, so that to realize a partial opening of only the front region of the roof, the front roof sections must be moved below the rear roof sections. This considerably reduces the head clearance. In modern, low-lying motor vehicles this is always associated with risk of injury to persons seated in the back seat unless the head clearance is so low that passengers are actually forced to get out of the vehicle before the displacement of the front roof sections is carried out.

In another specific embodiment involving a roof with a total of two roof sections, the cited document discloses the possibility of moving the front roof section over the rear window and then lowering both roof sections over the trunk. However, supporting the roof parts outside of the automobile body is undesirable in practice for aesthetic reasons and safety reasons.

SUMMARY OF THE INVENTION

The objective of the invention is to improve the possibilities for roof opening in a motor vehicle of a general type.

The invention achieves this objective with a motor vehicle with an automobile body, which includes rigid automobile body regions located on both sides above side window regions, wherein, in a closed roof position, at least two panel-shaped roof sections lie one after the other between the two rigid automobile body regions and can be moved out of the closed position into an open position further below in the automobile body, characterized by the fact that, from the closed position of the roof sections, at least a front roof section can be moved over the roof section that is located behind it by guiding it laterally in the manner of a sliding sunroof; that the front end regions of the roof sections can be raised from this position, and the roof sections, with their front ends raised, can be lowered into the automobile body; and that, in the closed position of the roof sections, a rear window, which can be separately moved between an open position and a closed position, borders directly on the rear roof section.

By guiding the front roof section over the rear roof section, the front roof section can be used as a sort of sliding sunroof, even during travel, without there being any problems with head clearance, even if passengers occupy the back seat. Continued opening of the roof also does not lead to a reduction of head clearance, but rather when the operation of lowering the roof sections begins, the front region of the roof sections is actually raised, so that the passenger head clearance is not reduced at any time compared to the amount of head clearance that is present when the roof is closed. At the same time, due to the separately displaceable rear window, a large opening can be optionally created over the entire interior, so that a convertible-like open-air feeling is obtained.

If the front roof section borders on the windshield frame, when the roof sections are opened, this opening can extend as far as the windshield frame, which further enhances the convertible-like feeling, and at the same time, due to the rigid automobile body sections remaining above the side windows, accident safety is increased compared to a full convertible.

If the roof section covered by the front roof section in the open sunroof position is guided in a guide rail during the downward movement into the automobile body only in its rear half opposite the direction of vehicle travel, the forward part is movable and can be raised. The rear guidance is preferably achieved by rollers arranged one after the other, and the distance between the rollers is sufficiently small that they do not become jammed even in tight bends.

Even a four-seat interior can be completely covered or opened with only two movable roof sections and the displaceable rear window. The mechanical effort is minimized, since the number of sections to be moved is as small as possible.

Nevertheless, vertical lowering of both the rear window and the front roof sections into the automobile body is advantageously possible.

Further advantages and features of the invention are apparent from the specific embodiments of the object of the invention that are at least schematically illustrated in the drawings and described below.

DETAILED DESCRIPTION OF THE INVENTION

Figure 1:
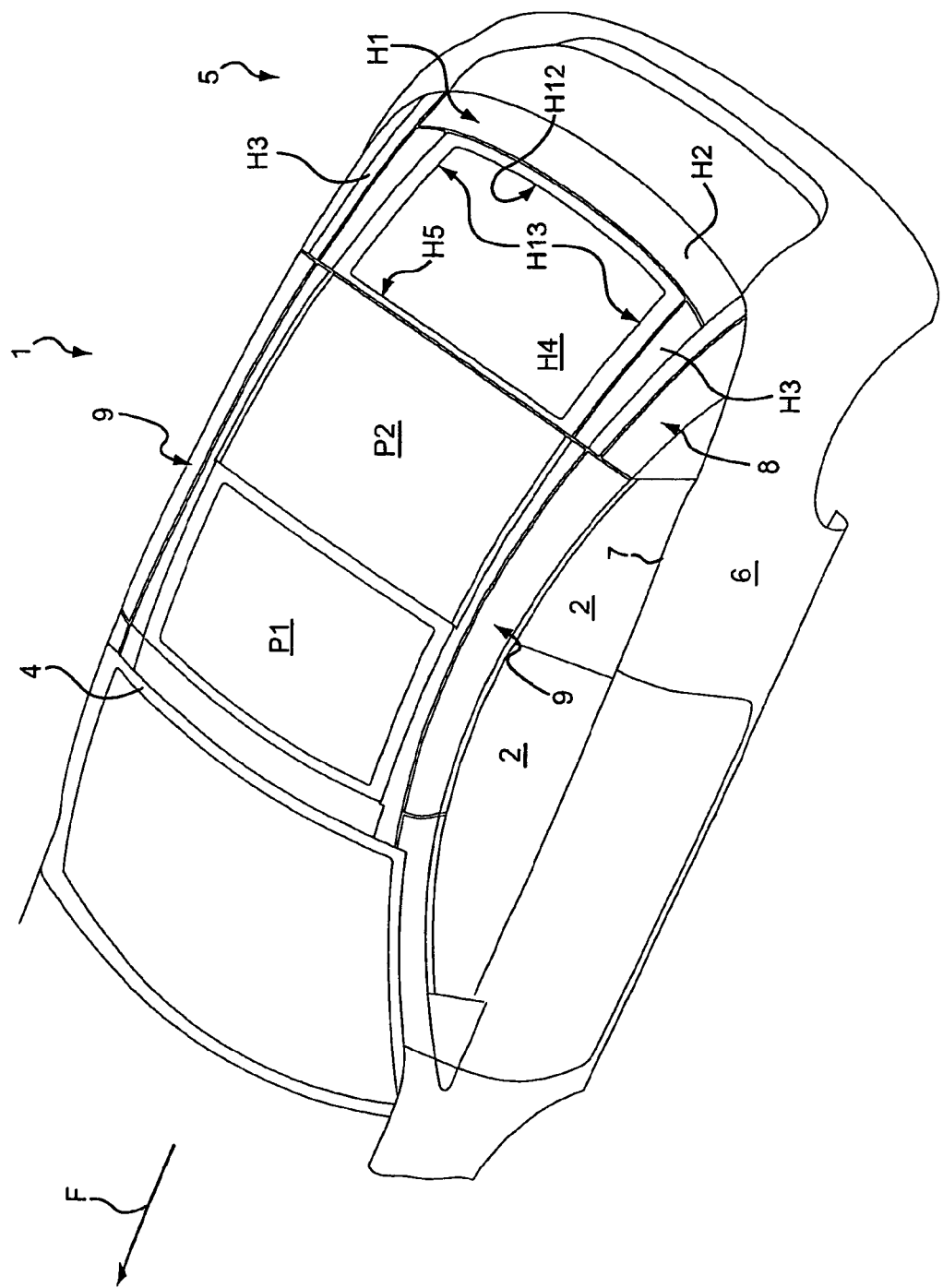
FIG. 1 shows an oblique rear perspective view of a motor vehicle of the invention with a closed rear window and a hatch in the closed position and with two other movable panel sections in front of the upper and front edge of the hatch (with respect to the direction of travel of the vehicle).

The drawings generally show a four-seat or five-seat motor vehicle 1 with a rear seat. However, this is not required. For example, a two-seat motor vehicle can also be designed in accordance with the invention.

The vehicle 1 has side windows 2 that are bounded above by intrinsically rigid roof rails 3, which, as viewed from above, run essentially lengthwise in the longitudinal direction of the vehicle between a windshield frame 4 and the rear section 5 of the vehicle, and which have a curved shape as viewed from the side. These roof rails are part of the automobile body 6.

The rear section 5 has a hatch H1. The hatch H1 has an essentially U-shaped design here with a lower crosspiece H2, which can contain, for example, parts of the taillights and/or a license plate mount, and with side pieces H3, which, in the closed position of the hatch H1, are directed forward and upward in the direction of vehicle travel F and follow the curve of the roof rails 3. An especially rigid rear window H4, which can consist, for example, of plastic or, advantageously, glass, is held between the parts H2 and H3 in its closed position. In this position, the side pieces H3 thus serve as lateral frame parts of the rear window H4. The upper and forward edge H5 of the rear window H4 in the direction of vehicle travel F simultaneously forms the upper and forward edge of the hatch H1 and is not supported from below by a transverse support due to the U-shape of the hatch H1.

Figure 3:
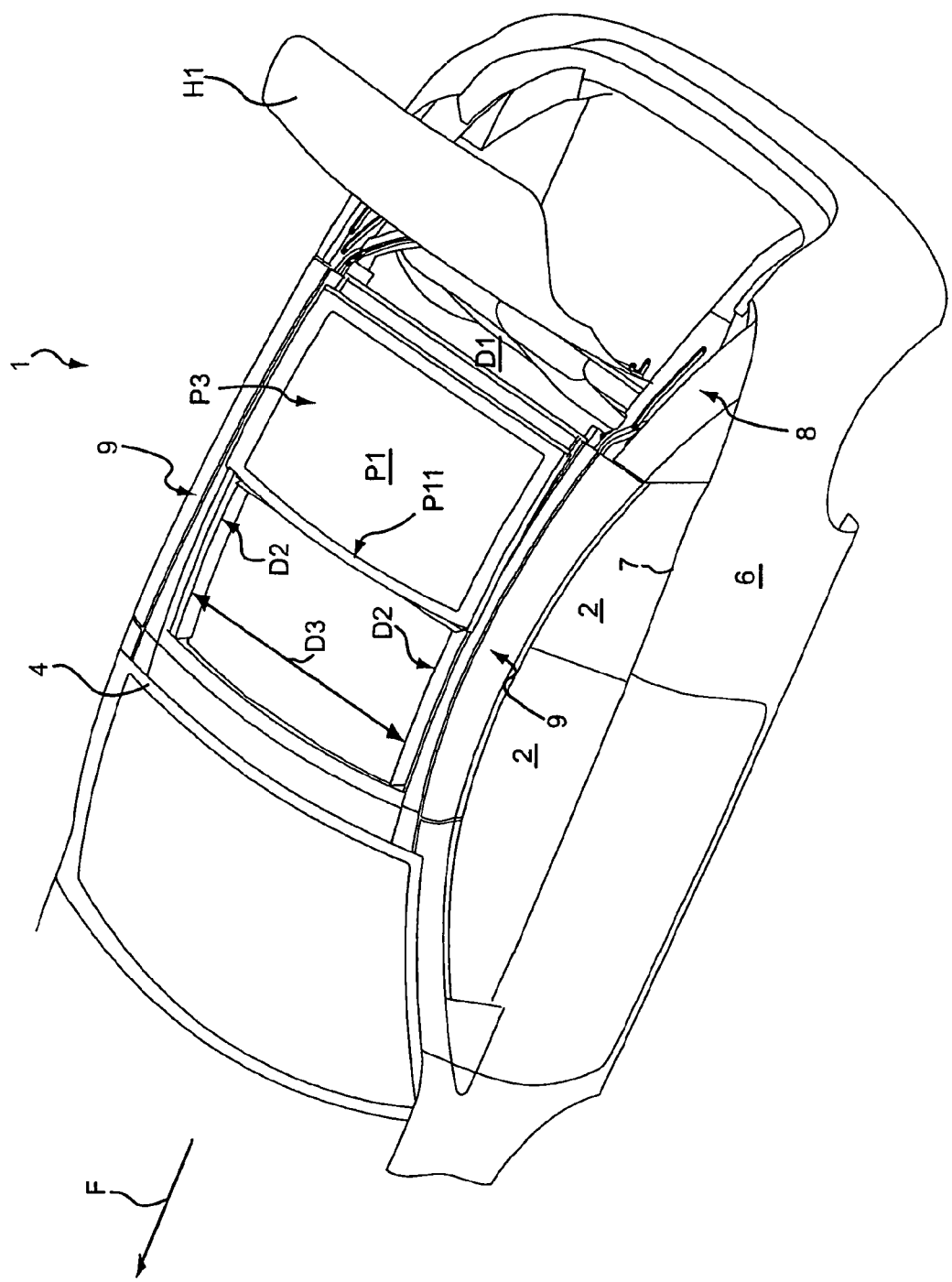
FIG. 3 shows a view similar to that of FIG. 2 with the hatch in the open position.
Figure 4:
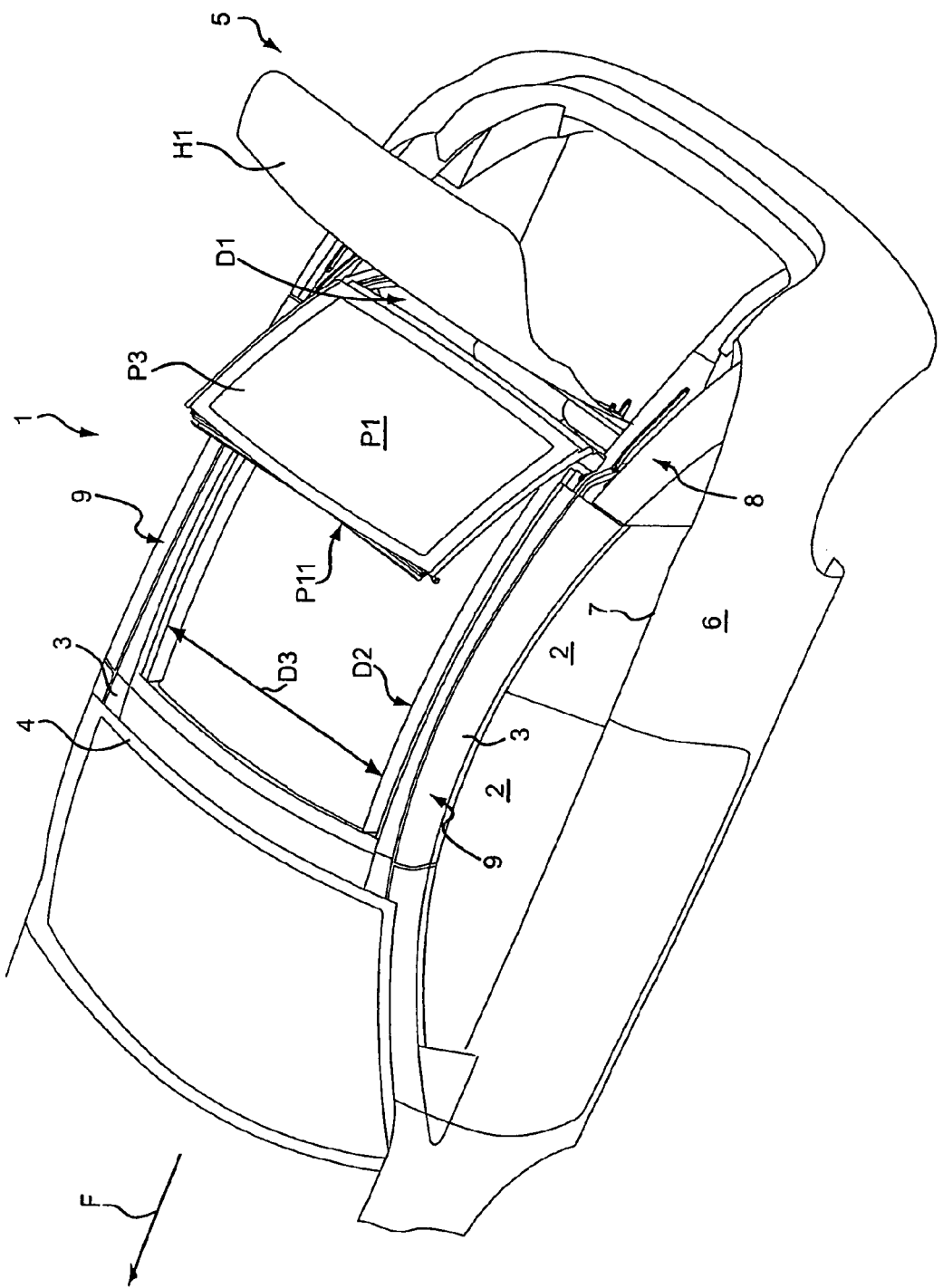
FIG. 4 shows a view similar to that of FIG. 3 during the opening of the two front panel sections.
Figure 5:
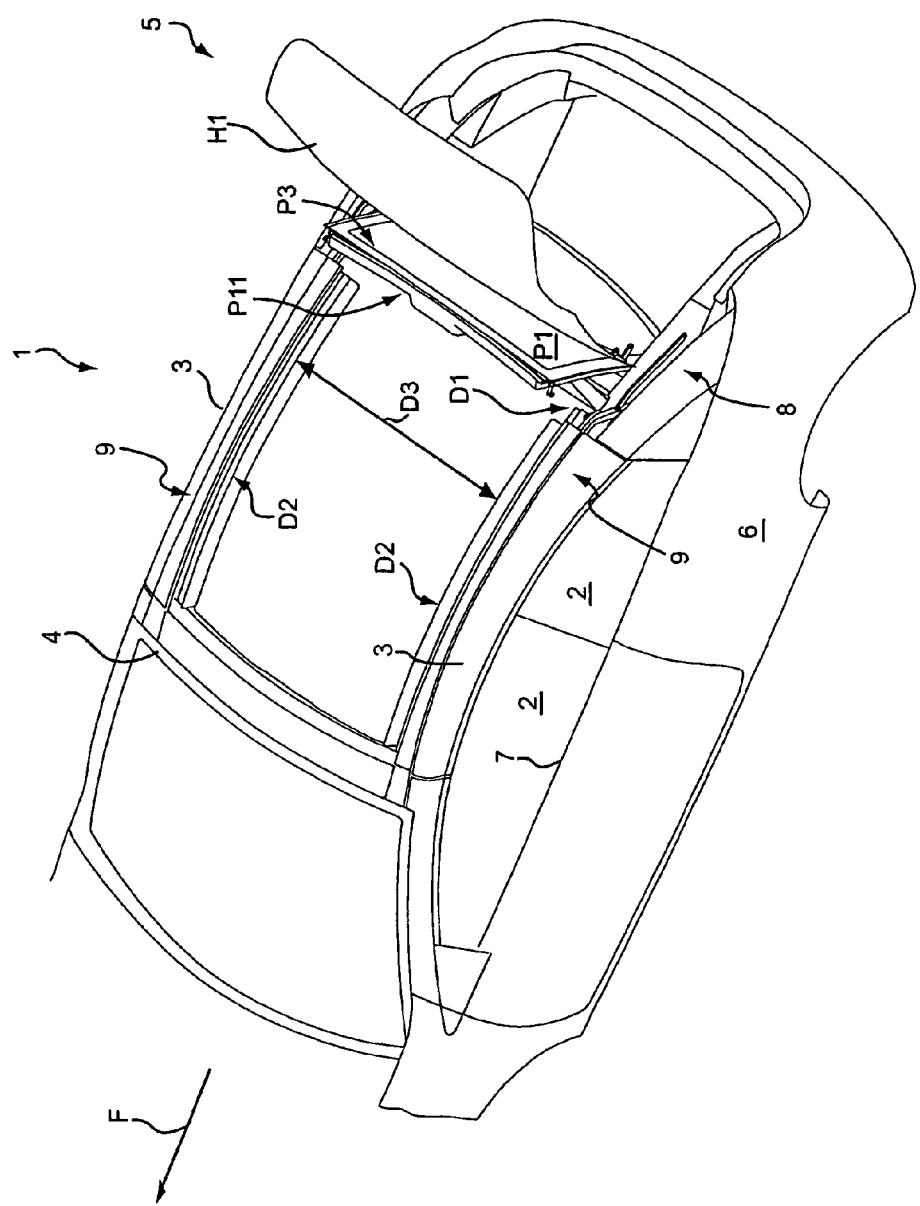
FIG. 5 shows a view similar to that of FIG. 4 with further progression of the opening of the front panel sections.
Figure 6:
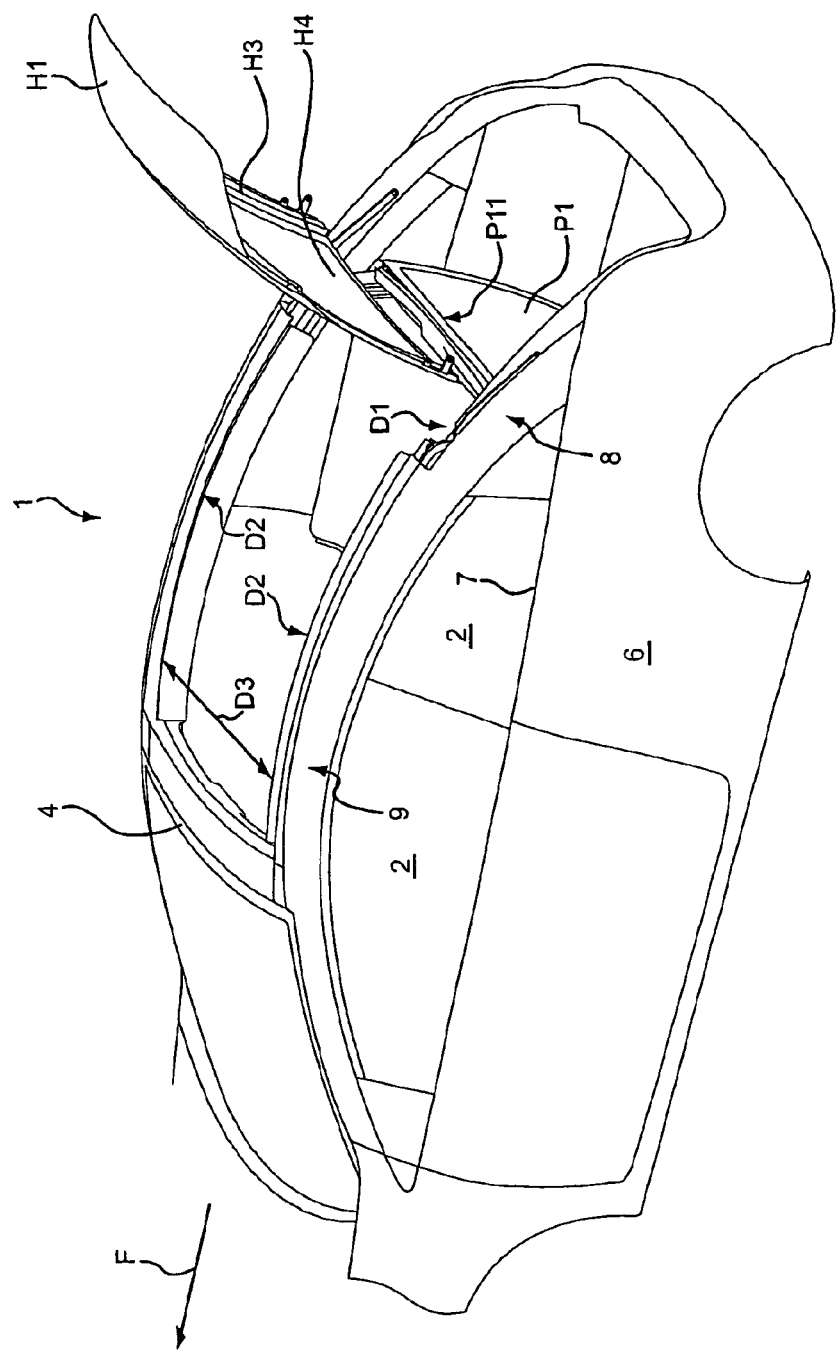
FIG. 6 shows a view similar to that of FIG. 5 with the front panel sections lowered essentially vertically into the automobile body.
Figure 7:
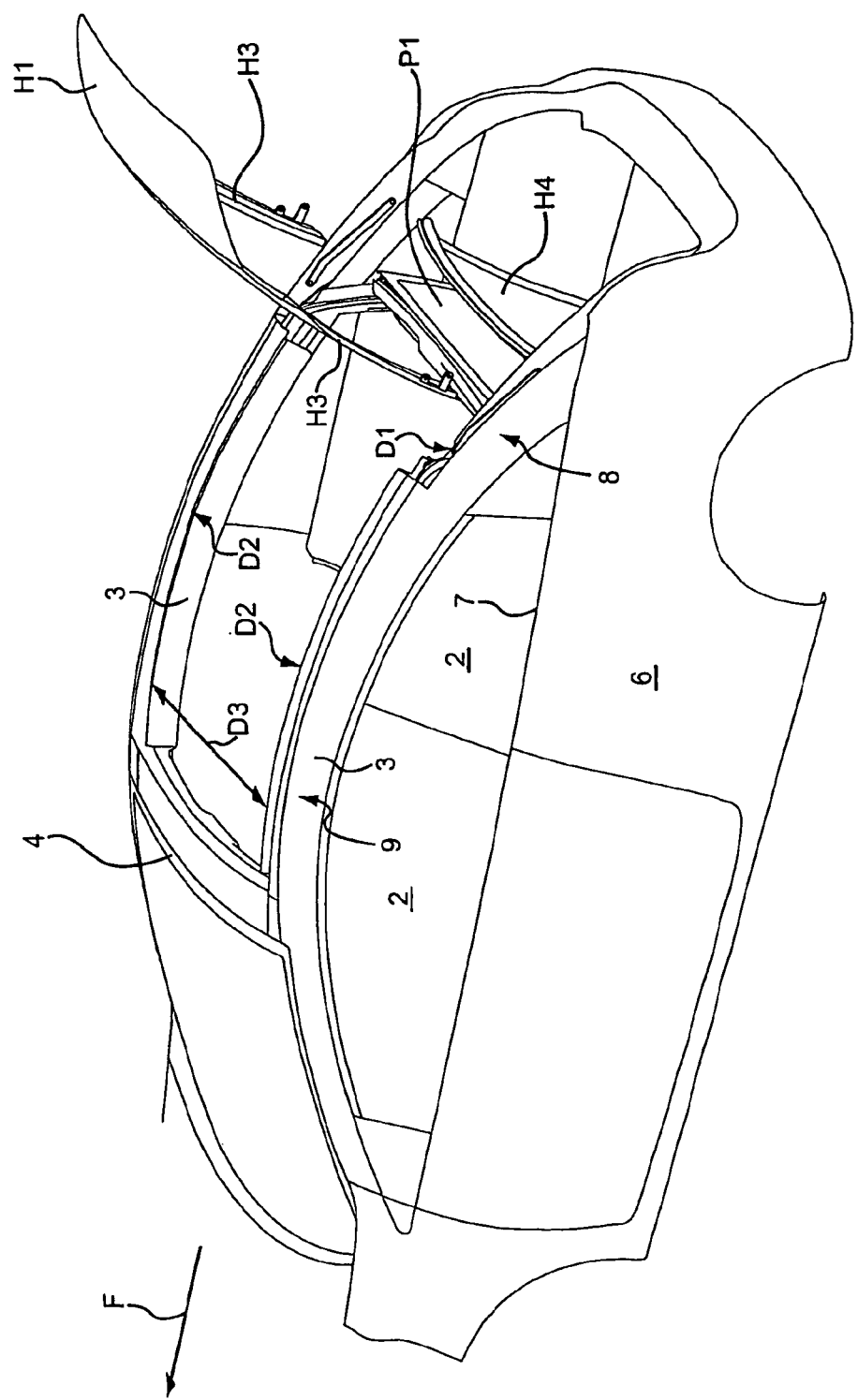
FIG. 7 shows a view similar to that of FIG. 6 with the rear window also lowered in its released position in the automobile body.
Figure 9:
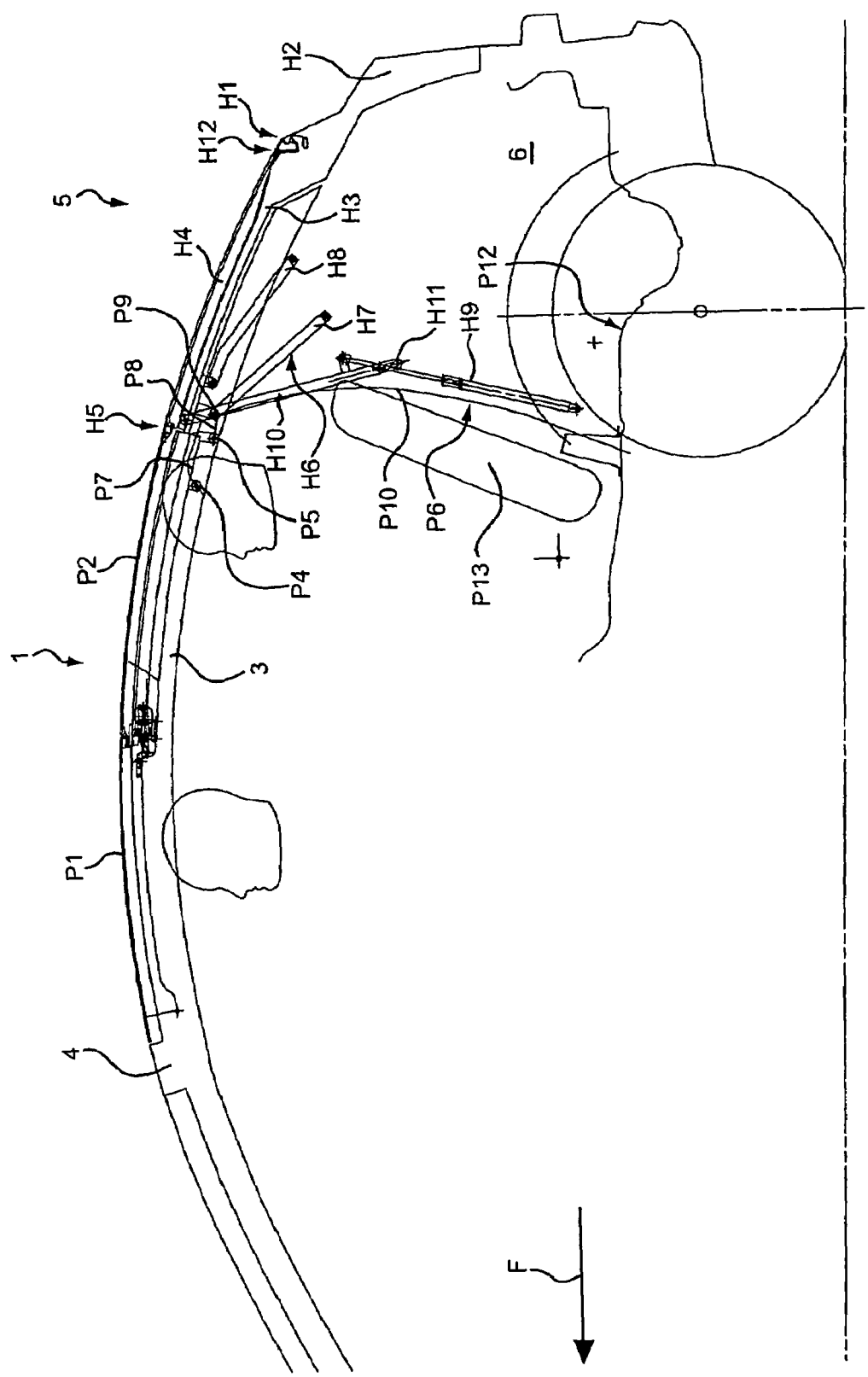
FIG. 9 shows a schematic side view of the vehicle in the roof position according to FIG. 1.
Figure 10:
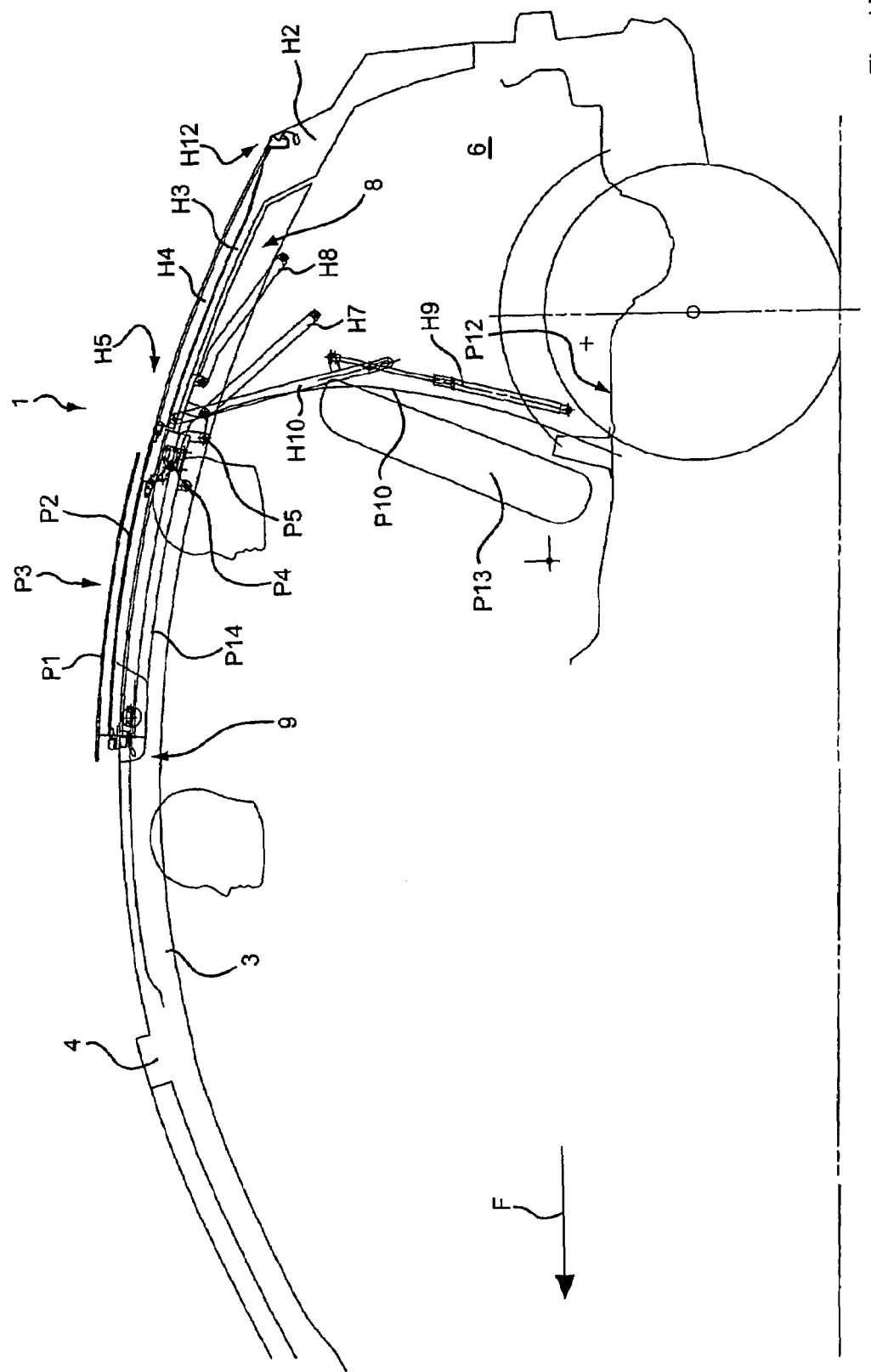
FIG. 10 shows a view similar to that of FIG. 9 but after the forwardmost panel section has been opened corresponding to the roof position of FIG. 2.

The hatch H1 is movably supported all together between a closed position (FIG. 1) and an open position (FIG. 3). The opening movement is not a pure swinging movement but rather occurs in such a way that in its open position, the front edge H5 of the hatch H1 is moved towards the rear relative to its closed position. For this purpose, the hatch H1 is supported (FIG. 9 ff.) on each side of the vehicle, for example, by a multijoint linkage, which in the present case is a four-bar linkage H6. The links H7 and H8 of the linkage H6 are each articulated laterally in the automobile body 6, for example, in the rear region of the roof rails (3).

Figure 12:
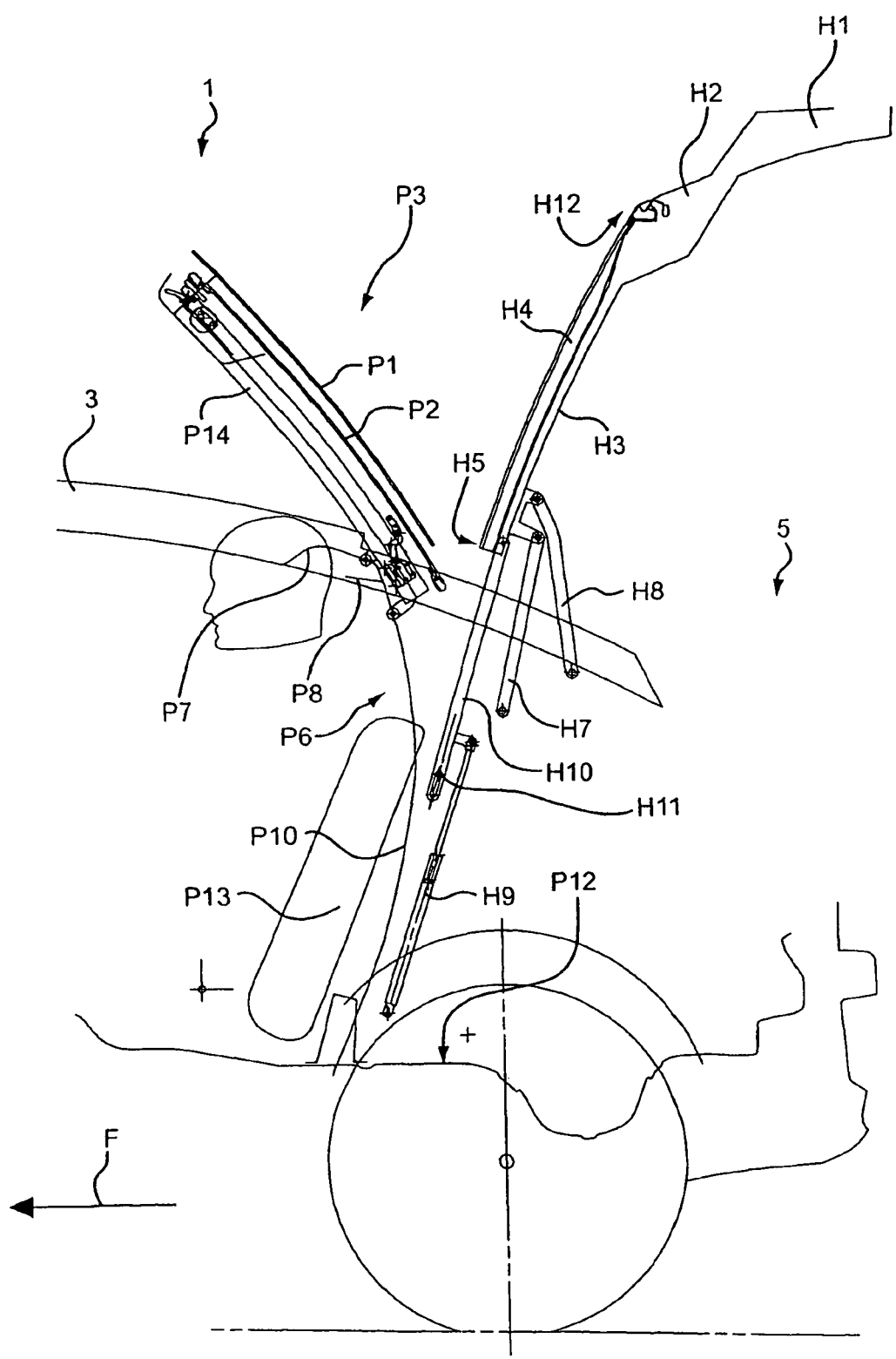
FIG. 12 shows a view similar to that of FIG. 11 but during the opening of the two front panel sections corresponding to the roof position of FIG. 4.

The rear window H4 can be lowered from the open position of the hatch H1 shown in FIGS. 3 and 12 into its separate released position in the automobile body 6.

For this purpose, for example, the rear window H4 is connected with the automobile body 6 by linkage parts H9, H10 arranged laterally in the body 6. Linkage part H9 is a cylinder that can be extended and retracted. Due to its length variability, even when the rear window H4 is closed, the linkage part H9 is able to move along with the opening movement of the hatch H1, which then encloses the rear window (transition from FIG. 1 to FIG. 3).

The cylinder H9 is articulated at one end to the automobile body 6. Its free end acts on another link H10, which is articulated higher in the automobile body 6, and this point of application of force to the link H10 by the link H9 is located some distance from the articulation H11 of the link H10, so that a lever arm is produced.

Figure 15:
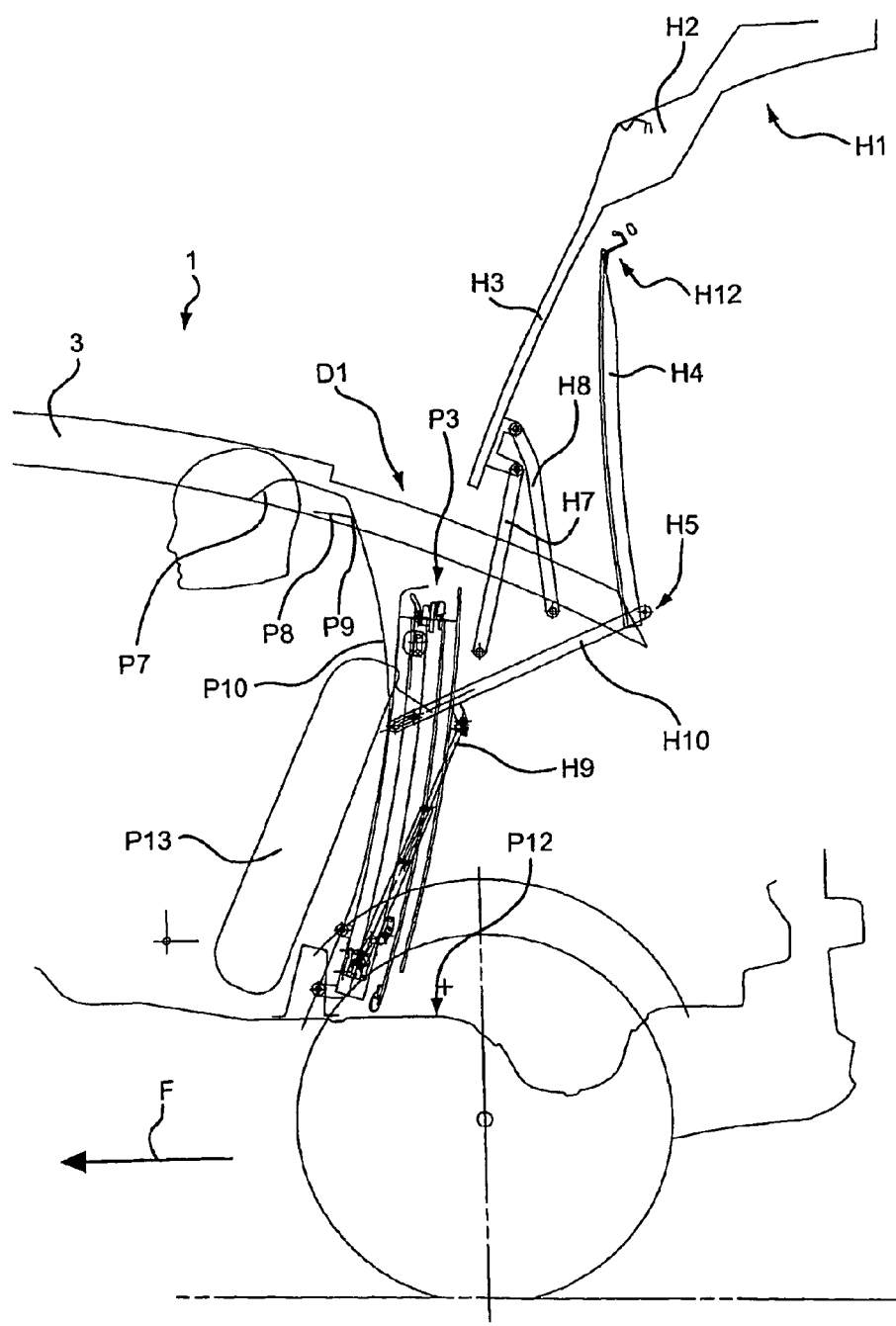
FIG. 15 shows a view similar to that of FIG. 14 but as the rear window is being swung out of its closed position in the hatch.
Figure 16:
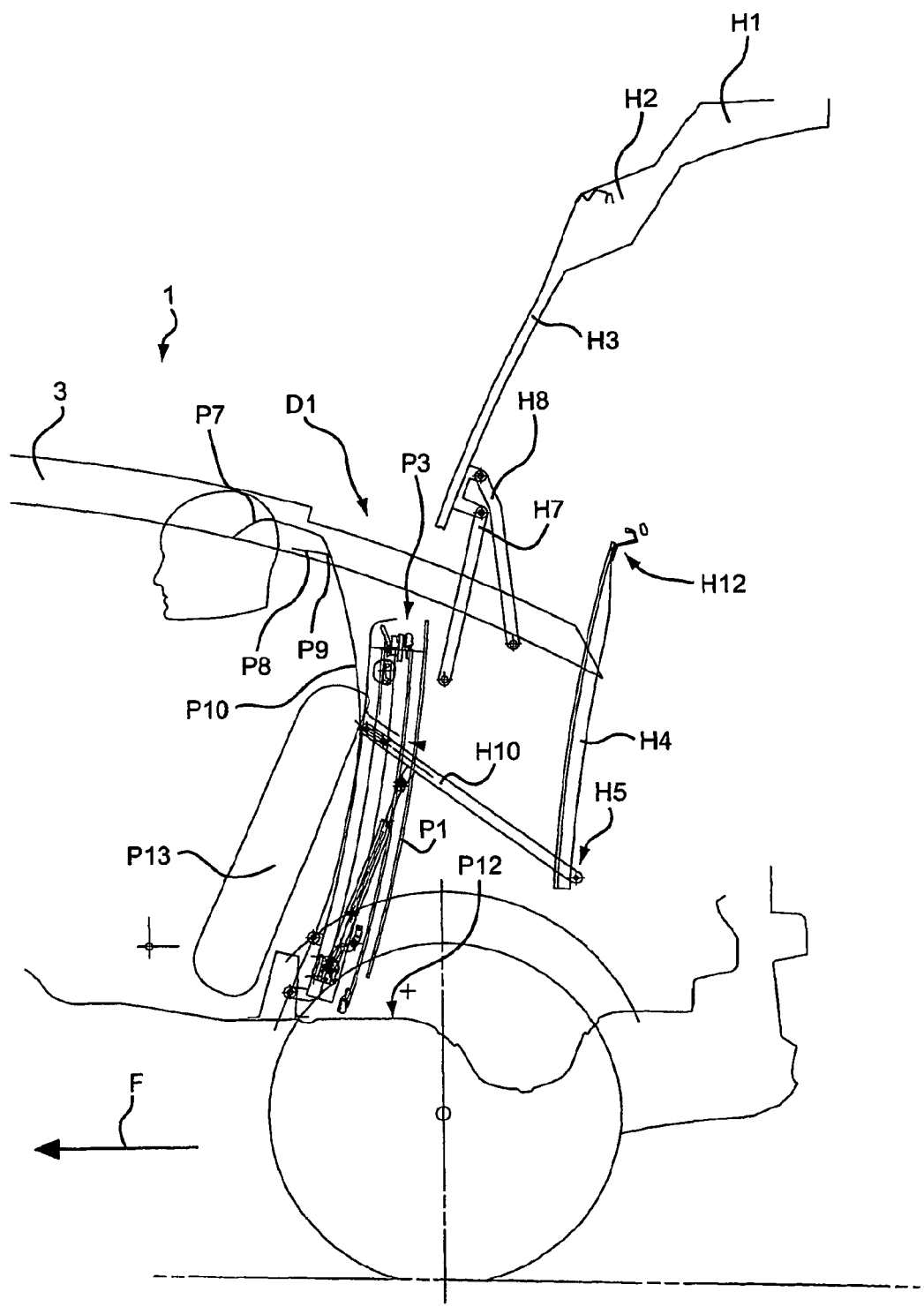
FIG. 16 shows a view similar to that of FIG. 15 with further progression of the opening of the rear window.

The free end of the link H10 acts laterally to the upper edge H5 of the rear window H4. To move the rear window H4 into its released position, the rear window H4 is first unlocked at its end H12, which forms the lower edge in the closed position, from the lower crosspiece H2 of the hatch H1 (transition from FIG. 14 to FIG. 15), and the rear window H4 can be manually held by a user at its lateral edges H13 and manually moved almost parallel downward (FIG. 16). During this operation, the lever H10 is swung downward about the joint H11, and the cylinder H9 retracts and swings forward. All together, the rear window H4 is thus lowered at least almost vertically and displaced slightly forward to save space. In its lowered position, it is stowed with other roof parts as a group, which will be explained in greater detail below.

Figure 17:
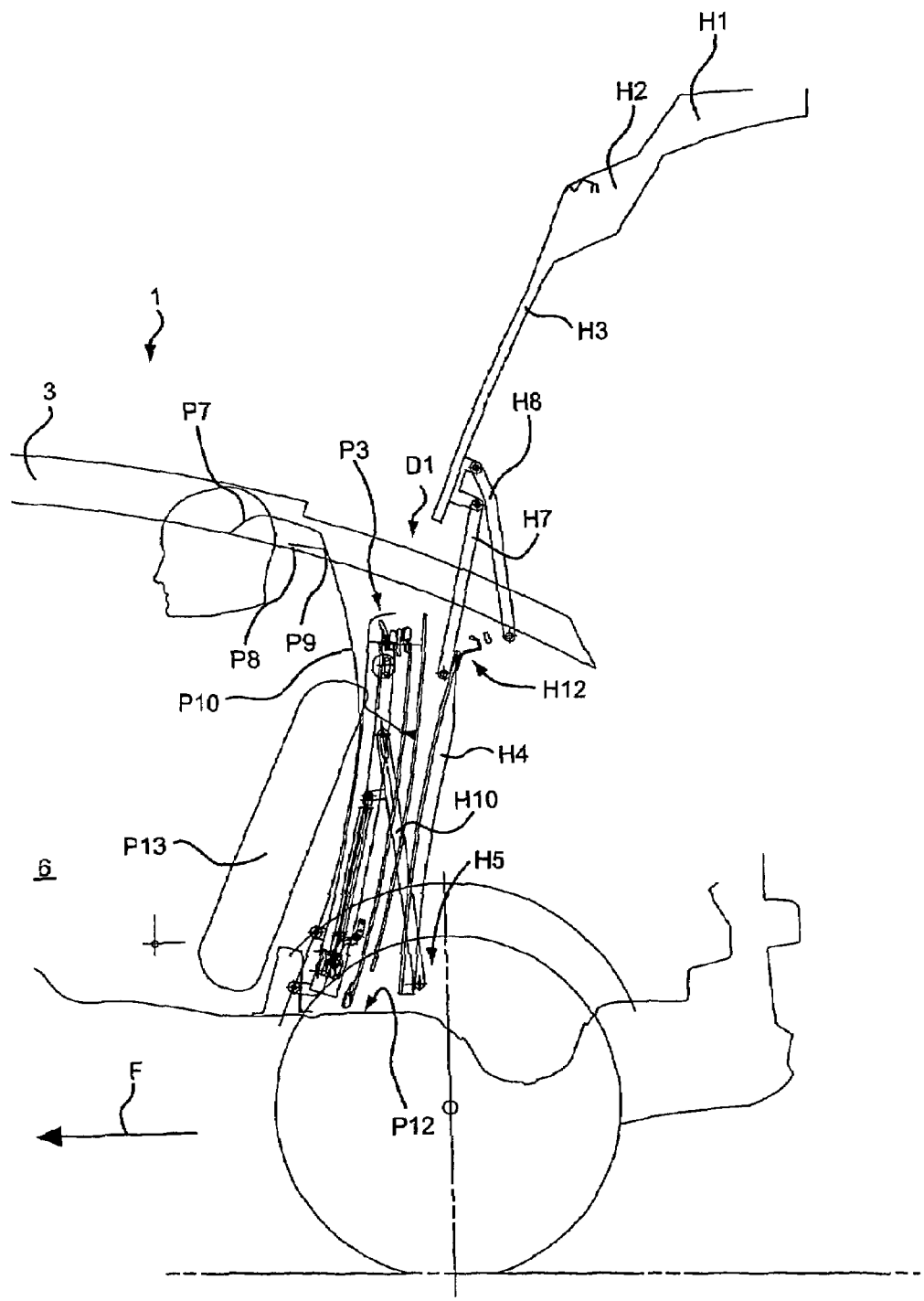
FIG. 17 shows a view similar to that of FIG. 16 with the rear window completely in its released position corresponding to the position of FIG. 7.
Figure 18:
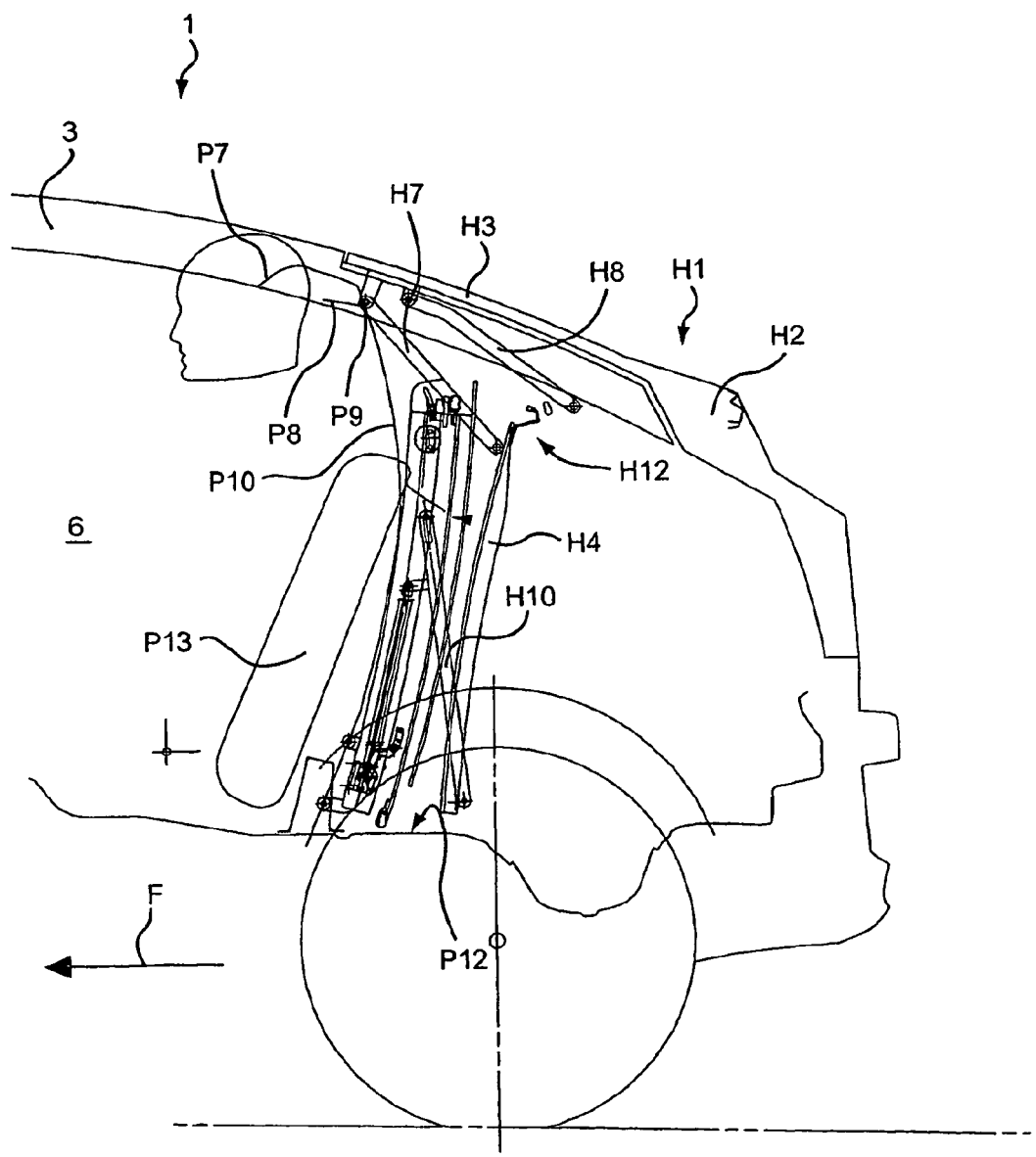
FIG. 18 shows a view similar to that of FIG. 17 after the hatch has been moved into its closed position corresponding to the position of FIG. 8.

In this released position (FIG. 17), the rear window H4 is held below a lateral belt line 7 of the automobile body 6 some distance from the hatch 1. The space between the side pieces H3 and the lower crosspiece H2 of the hatch H1 is completely opened. The hatch H1 can then be closed again (FIG. 18).

In the closed position of the rear window H4 (FIG. 1), the motor vehicle 1 has additional movable panel sections P1, P2 immediately in front of the front edge H5 of the rear window H4 with respect to the direction of vehicle travel F. The number of these panels is variable, depending on the length of the roof. In the closed state, they are arranged essentially horizontally one behind the other, are flush with each other and are flush with the rear window H4. They are supported directly or indirectly on the lateral roof rails 3. The (in this case) two roof sections P1 and P2 can be made of various materials, such as metallic, glass, or plastic materials. In particular, they can be essentially transparent materials. In this regard, to prevent "shadow stripes" in the interior as much as possible, it is advisable that the roof sections P1, P2 not be made too narrow in the longitudinal direction of the vehicle. Therefore, a minimum length of 40 cm in the longitudinal direction of the vehicle is advantageous.

Figure 2:
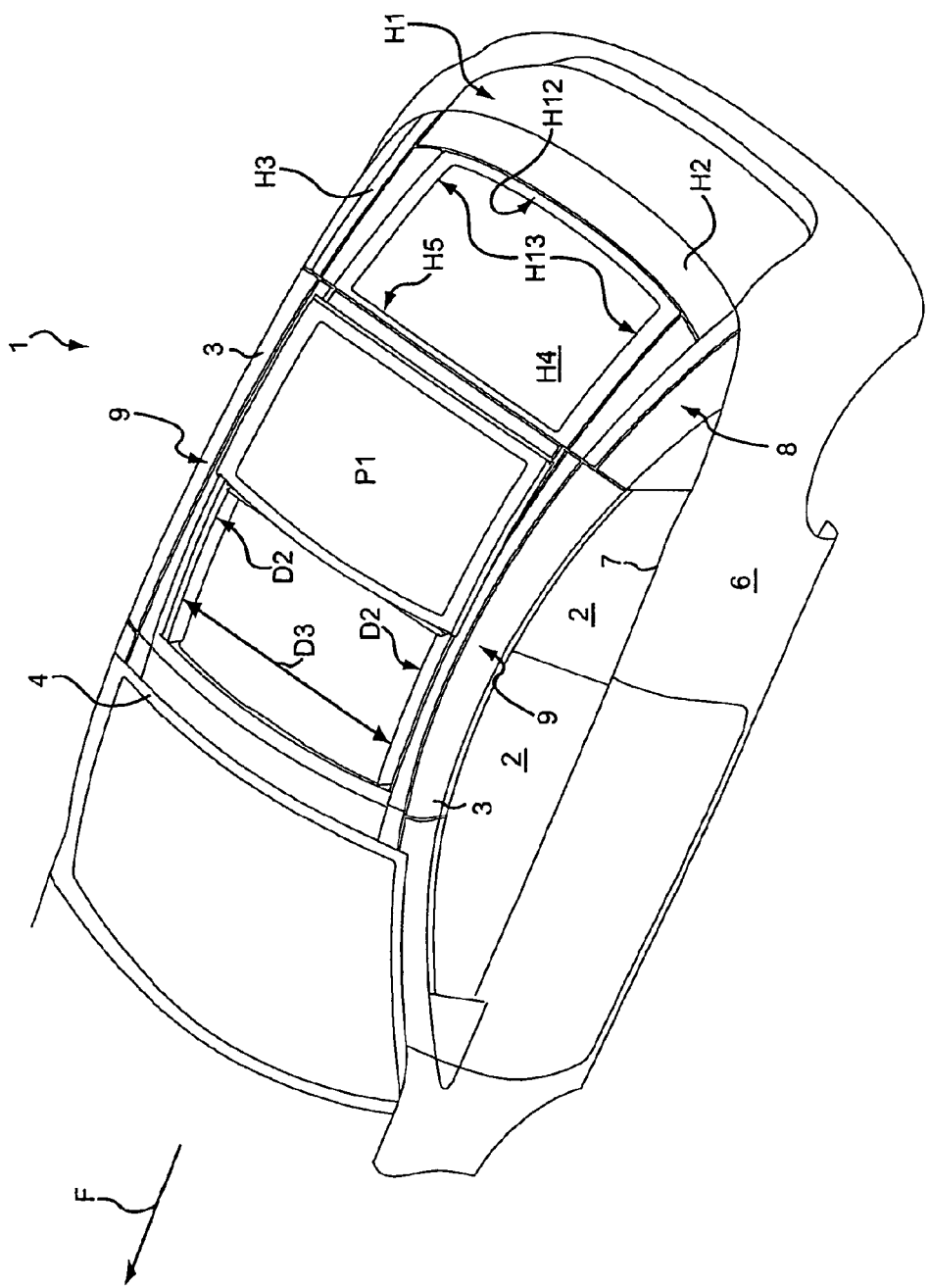
FIG. 2 shows a view similar to that of FIG. 1 after the forwardmost panel section has been opened.

The front roof section P1 can be moved from the closed position over the roof section P2 behind it in the manner of a sliding sunroof and in its opened position, it rests essentially parallel on roof section P2 (FIG. 2 ff.). The position of the roof sections P1, P2 produced in this way represents a possible permanent driving position. However, from this position, the roof can be opened further with a downward displacement of the combined stack P3 of roof sections P1 and P2, which is lowered within the automobile body 6.

For this purpose, the stacked group of roof sections P3 formed in this way is supported in the rear region of the rear roof section P2 by two guide rollers P4, P5 arranged one behind the other in a lateral guide rail P6.

Figure 11:
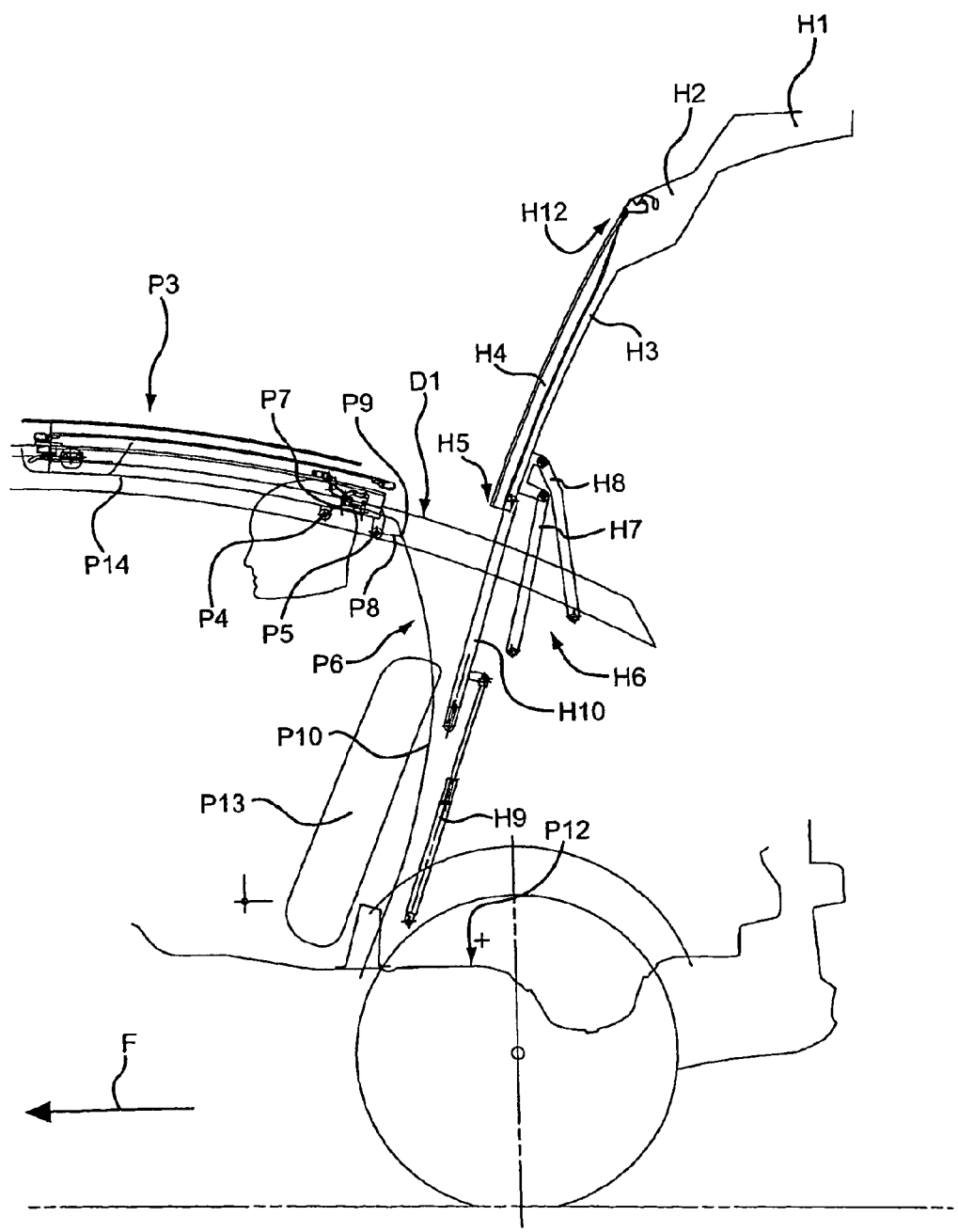
FIG. 11 shows a view similar to that of FIG. 10 but with the hatch in the open position corresponding to the roof position of FIG. 3.

When the operation of lowering the stack of roof sections P3 in the automobile body 6 begins (transition from FIG. 11 to FIG. 12), the front roller P4 of the pair of guide rollers P4, P5 runs towards the rear on an upwardly directed guideway section P7, whereas the rear guide roller P5 initially runs in an almost horizontal guideway section P8. At point P9, the section P8 enters the gently curved, downwardly running section P10 of the guide rail P6.

Due to the rearwardly and upwardly directed slope of the section P7, as the stack of roof sections P3 starts to move, its forward edge P11 is immediately raised, so that the head clearance, even for passengers sitting in the back seat, does not during any phase of the movement fall below the amount of head clearance present when the roof sections P1, P2 are closed.

Figure 13:
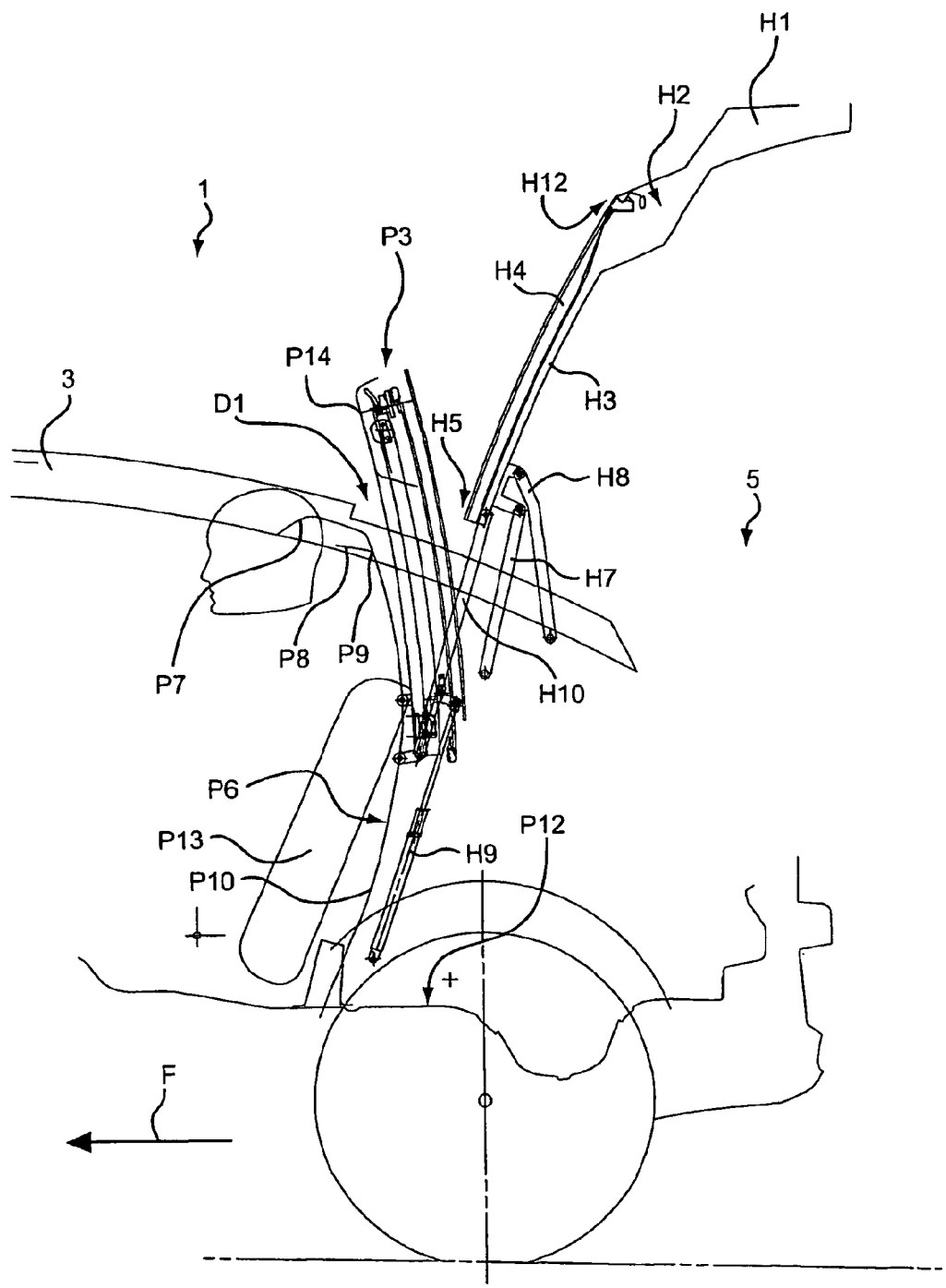
FIG. 13 shows a view similar to that of FIG. 12 but during further progression of the opening of the front panel sections corresponding to the roof position of FIG. 5.
Figure 14:
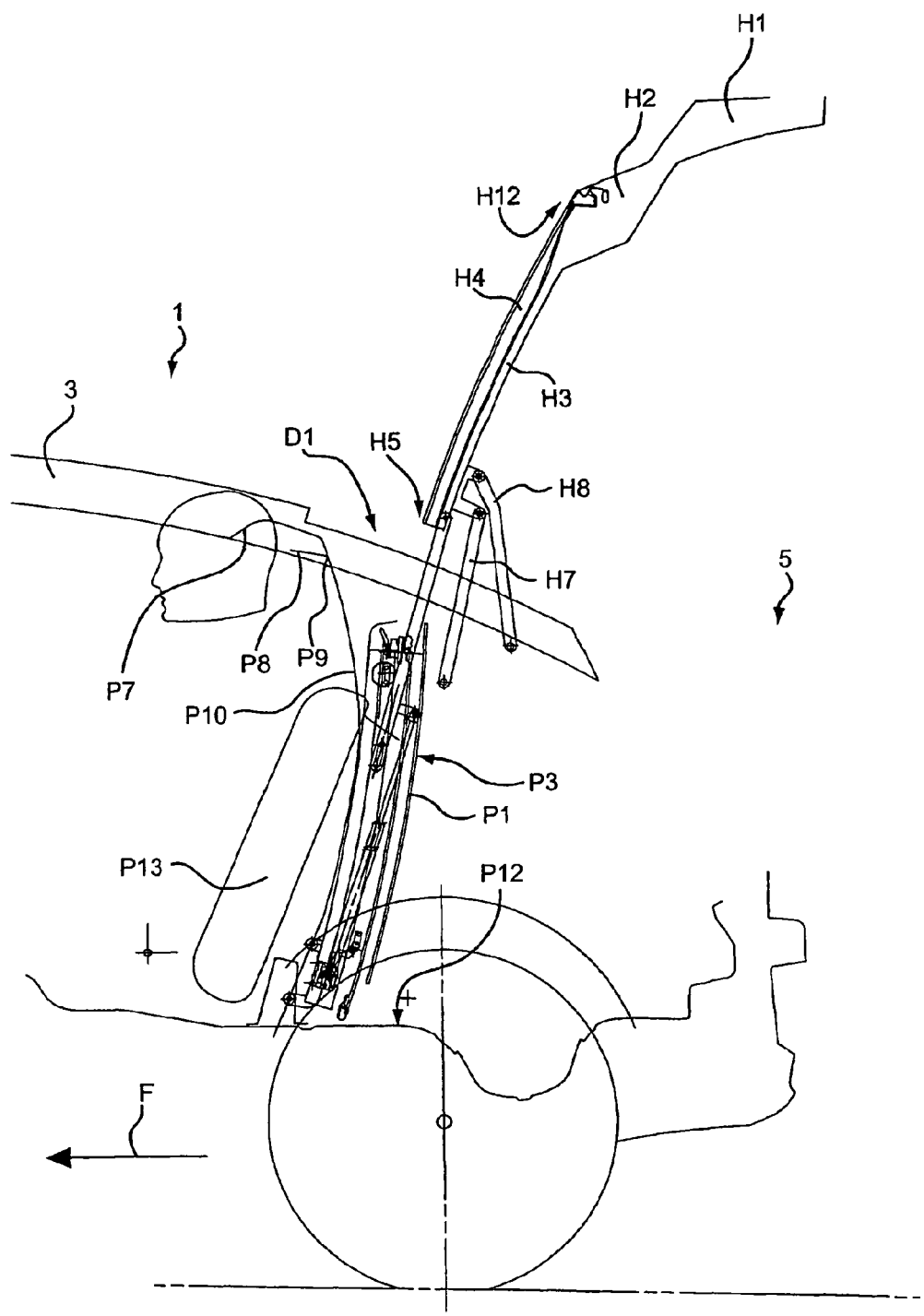
FIG. 14 shows a view similar to that of FIG. 9 but with completely opened front panel sections corresponding to the roof position of FIG. 6.

When the rear guide roller P5 enters section P10, the front guide roller P4 runs in a section of the guideway P6 that follows the curve of the lateral roof rails 3, so that with the almost vertical downward movement of the rear guide roller P5, the steep orientation of the stack of roof sections P3 increases, and when the front guide roller P4 also enters the section P10, the stack P3 assumes an almost vertical position (FIG. 13). In this position, it can slide downward to the inner vehicle base P12 and assume an almost vertical position slightly behind the backrests P13 of the second row of seats to save space (FIG. 14).

The closing of the roof sections P1, P2 proceeds correspondingly but in the opposite direction, and in this operation as well, the head clearance does not during any phase of the movement fall below the amount of head clearance present when the roof sections are closed. The vehicle silhouette can thus be kept very flat and sporty.

If the front roof section P1 borders directly on the windshield frame 4, a very large roof opening can be created. The lateral autobody sections 3 above the side windows can also be designed very narrow, so that the width of the panel sections P1 and P2 can extend almost to the upper edge of the side windows.

To facilitate the lowering of the roof sections P1 and P2, the hatch H1, as has already been described, can open in such a way that in its open position, the front edge H5 is displaced to the rear relative to its closed position. This results in a passage space D1 in front of the opened hatch H1 with respect to the direction of vehicle travel F, and this passage space D1 lies completely behind the rear edge of the rear roof section P2 in its closed state. In this way, the lowering path of the stack of roof sections P3 through the interior of the vehicle can be shifted far to the rear in the vehicle 1. Any passengers that may be seated in the back seat are not disturbed by the lowering operation. Even in the case of a possible two-seater, the lowering path of the stack of roof sections P3 always lies behind the occupants of the vehicle. The head clearance of the occupants is not reduced by the lowering of the roof sections.

Figure 8:
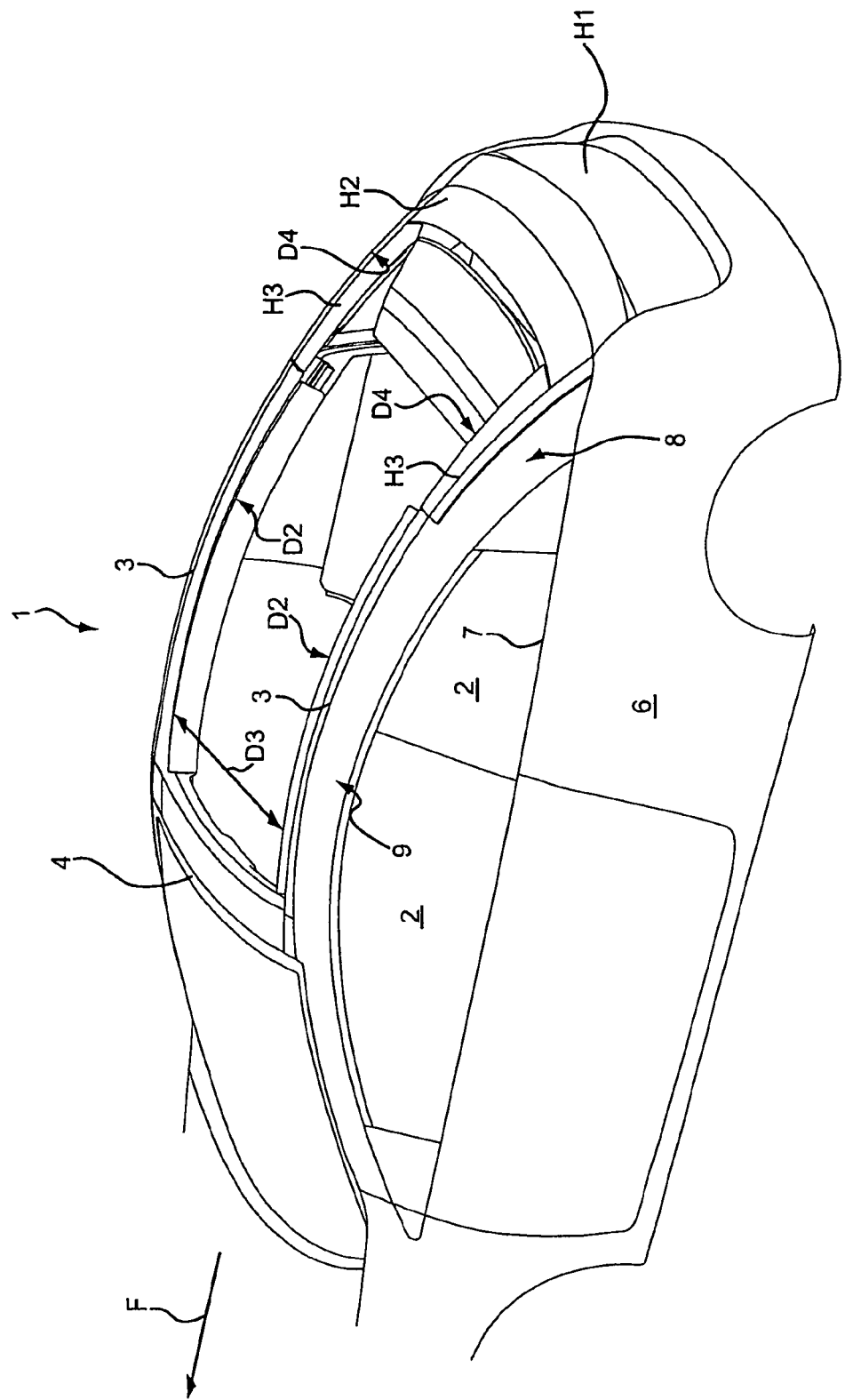
FIG. 8 shows a view similar to that of FIG. 7 after the hatch has been closed.

In this regard, in the closed state of the hatch H1, the frame parts H3, which laterally frame the rear window H4, can be aligned with the roof rails 3, which follow them towards the front in the direction of travel. A very advantageous visual effect is achieved in this way. In particular, in this case, no gradation is necessary in the inner edge D2 of the specified sections H3, 3 that faces the rear window H4 and the moving roof sections P1, P2, but rather this edge D2 runs straight over the entire interior (FIG. 8).

However, when the hatch H1 is opened, a passage space D1 is opened that is wider than the clear width D3 between the inner edges D2. This makes it possible to design the roof sections P1 and P2 very wide. A guide rail P14, which projects laterally beyond the roof section P2 and in which the front roof part P1 is guided in its open position, can additionally enter the interior of the automobile body 6 with the stack of roof sections P3 through the widened passage space D1.

To open the two sections P1 and P2 and the rear window H4, the hatch H1 is first opened to free the passage space D1. The roof sections P1, P2 can then be opened in the manner described above.

Prior to or after this, from the opened position of the hatch H1, the rear window H4 can be opened out of the frame pieces H2, H3 in one of the aforementioned ways and lowered into the interior in a space-saving position parallel to the roof sections P1 and P2. It is also possible to open only the rear window H4; only the front panel section P1; the rear window H4 and the panel section P1; or only the two forward roof sections P1 and P2, as desired.

The invention can be used both in vehicles with manually moved roof sections P1, P2, H4 and in vehicles with fully automatically or semiautomatically moved roof sections.

The invention claimed is:

1. Motor vehicle (1) with an automobile body (6), which includes two rigid automobile body regions (3) located on both sides above side window regions (2), wherein, in a closed roof position, at least two panel-shaped roof sections (P1; P2) lie one after the other between the two rigid automobile body regions (3), can be moved relative to the lateral automobile body sections (3), and can be moved out of the closed position into an open position further below in the automobile body (6), wherein, from the closed position of the roof sections (P1; P2), at least a front roof section (P1) can be moved over a rear roof section (P2) that is located behind it by guiding it laterally in the manner of a sliding sunroof; wherein front end regions (P11) of the roof sections (P1; P2) can be raised from this position, and the roof sections (P1; P2), with front ends (P11) thereof raised, can be lowered into the automobile body (6), wherein the roof section (P2) covered by the front roof section (P1) in the open sunroof position is guided in a guide rail (P6) during the downward movement into the automobile body (6) only in its rear half opposite the direction of vehicle travel (F); a roof section (P2) covered by the front roof section (P1) in an open sunroof position is guided in a guide rail (P6) during the downward movement into the automobile body (6) only in a rear half thereof opposite the direction of vehicle travel (F) and that, in the closed position of the roof sections (P1; P2), a rear window (H4), which can be separately moved between an open position and a closed position, borders directly on the rear roof section (P2).

2. Motor vehicle (1) in accordance with claim 1, wherein the front roof section (P1) is arranged as a roof section following behind a windshield frame (4).

3. Motor vehicle (1) in accordance with claim 1, wherein each of the roof sections (P1; P2) extends at least 40 centimeters in the longitudinal direction of the vehicle.

4. Motor vehicle (1) in accordance with claim 1, wherein the roof sections (P1; P2) are essentially transparent.

5. Motor vehicle (1) in accordance with claim 1, wherein in its closed position, the rear window (H4) is held in an essentially U-shaped opening of a hatch (H1) and is at least partially surrounded by the sides (H3) and lower edge (H2) of the hatch (H1).

6. Motor vehicle (1) in accordance with claim 1, wherein the rear window (H4) and the roof sections (P1; P2) lie parallel to one another in the open position.

7. Motor vehicle (1) in accordance with claim 5, wherein during the opening of the hatch (H1), the forwardmost region (H5) of the hatch (H1) can be displaced rearward in the direction opposite the direction of vehicle travel, and during this displacement, the hatch (H1) frees a passage space (D1), which is covered when the hatch (H1) is closed, to allow the roof sections (P1; P2) to be moved into the automobile body.

8. Motor vehicle (1) in accordance with claim 7, wherein in the closed state of the hatch (H1), the sides (H3) are in alignment with automobile body regions (3) of the vehicle (1) that are positioned above side windows (2), which body regions (3) include at least roof rails and immediately follow the sides (H3) in the direction of vehicle travel (F).

9. Motor vehicle (1) in accordance with claim 8, wherein the passage space (D1) is widened relative to a clear width (D3) between the roof rails (3) in the transverse direction of the vehicle.

* * * * *